US011305229B1

United States Patent
He et al.

(10) Patent No.: US 11,305,229 B1
(45) Date of Patent: Apr. 19, 2022

(54) CO2 SORBENT MATERIALS FOR ADVANCED CARBON CAPTURE TECHNOLOGIES AND DIELECTRIC BARRIER DISCHARGE (DBD) PLASMA BASED PROCESSES

(71) Applicant: Advanced Energy Materials, LLC, Louisville, KY (US)

(72) Inventors: Juan He, Louisville, KY (US); Tu Nguyen, Louisville, KY (US); Mahendra Sunkara, Louisville, KY (US)

(*) Notice: Subject to any disclaimer, the term of this patent is extended or adjusted under 35 U.S.C. 154(b) by 0 days.

(21) Appl. No.: 17/139,821

(22) Filed: Dec. 31, 2020

Related U.S. Application Data (60) Provisional application No. 62/956,720, filed on Jan. 3, 2020.

(51) Int. Cl.
| | | |
|---|---|---|
| *B01D 53/62* | (2006.01) | |
| *B01J 20/34* | (2006.01) | |
| *B01D 53/14* | (2006.01) | |
| *B01D 53/81* | (2006.01) | |
| *B82Y 30/00* | (2011.01) | |
| *C01B 32/50* | (2017.01) | |

(52) U.S. Cl.
CPC .......... *B01D 53/62* (2013.01); *B01D 53/1418* (2013.01); *B01D 53/1475* (2013.01); *B01D 53/81* (2013.01); *B01J 20/3433* (2013.01); *B01J 20/3441* (2013.01); *C01B 32/50* (2017.08); *B01D 2253/112* (2013.01); *B01D 2257/504* (2013.01); *B01D 2258/0283* (2013.01); *B82Y 30/00* (2013.01)

(58) Field of Classification Search
CPC  B01D 53/62; B01D 53/1418; B01D 53/1475; B01D 53/81; B01D 2257/504; B01D 2253/112; B01D 2258/0283; B01J 20/3433; B01J 20/3441; B82Y 30/00
USPC .......................................................... 423/220
See application file for complete search history.

(56) References Cited

U.S. PATENT DOCUMENTS

| | | |
|---|---|---|
| 6,284,105 B1 | 9/2001 | Eliasson et al. |
| 6,375,832 B1 | 4/2002 | Eliasson et al. |
| 6,994,830 B1 | 2/2006 | Raybone et al. |
| 8,220,440 B2 | 7/2012 | Adams |
| 10,376,861 B2 | 8/2019 | Ghosh et al. |
| 10,486,104 B2 | 11/2019 | Reddy et al. |
| 2011/0052453 A1 | 3/2011 | McLarnon et al. |
| 2017/0355919 A1 | 12/2017 | Kim et al. |
| 2020/0129921 A1 | 4/2020 | Tosi et al. |

FOREIGN PATENT DOCUMENTS

WO  2009091437 A1  7/2009

OTHER PUBLICATIONS

Li et al., A Review of Recent Advances of Dielectric Barrier Discharge Plasma in Catalysis, Nanomaterials 2019, 9, 1428.

*Primary Examiner* — Anita Nassiri-Motlagh
(74) *Attorney, Agent, or Firm* — Law Office of J L Simunic; Joan Simunic

(57) ABSTRACT

The present development is a method for capturing and purifying $CO_2$ from a flue gas stream using a metal aluminate nanowire absorbent and then regenerating the absorbent. After the $CO_2$ is adsorbed into the absorbent, the adsorbent is regenerated by subjecting the $CO_2$ saturated adsorbent to a dielectric barrier discharge plasma or to a microwave plasma or to a radio frequency (RF) plasma while ensuring that the external temperature does not exceed 200° C.

16 Claims, 8 Drawing Sheets

Figure 6 (con't)

Figure 7 (con't)

CO2 SORBENT MATERIALS FOR ADVANCED CARBON CAPTURE TECHNOLOGIES AND DIELECTRIC BARRIER DISCHARGE (DBD) PLASMA BASED PROCESSES

CROSS-REFERENCE TO PRIOR APPLICATIONS

The present application claims priority to U.S. 62/956,720 filed 3 Jan. 2020, which is incorporated herein by reference in its entirety.

FIELD OF THE INVENTION

The invention relates to a process comprising dielectric barrier discharge for carbon dioxide sorption and desorption at low temperatures and to a composition for use in the process.

BACKGROUND OF THE INVENTION

The concentration of carbon dioxide ($CO_2$) in the Earth's atmosphere has increased significantly during the past 250 years from about 280 ppm to over 405 ppm. $CO_2$ emissions are considered to be a major contributing factor to the green-house effect and global warming. To counteract global warming, many government agencies around the world are establishing $CO_2$ emission limits, with the primary focus being on stationary sectors —the source of about 40% of anthropogenic $CO_2$ emissions.

A number of "clean power" technologies, such as nuclear, wind or solar power, are being deployed and further developed. Even with these alternative energy sources, the near-term demand for energy is expected to result in increased use of carbon-based fuels, including coal, oil and natural gas. As far out as 2050, carbon-based fuels are expected to provide up to 50% of the world's power sector demand. But to meet the government regulations it is necessary to find a means to decarbonize the carbon-based fuels currently in use and to reduce the power sector's emissions of $CO_2$. This would be most cost efficient if there was a way to retrofit current production equipment.

In view of the above, it would be beneficial to have a means to apply post-combustion capture solutions that can be retrofitted to existing plants as well as applied to newly built projects. It would further be beneficial to have a means for $CO_2$ capture for low-medium temperature applications from post-combustion coal-fired power plants, industrial boiler exhausts, natural gas combustion exhausts, high temperature applications with flue gas capture in cement plants, low temperature application in direct $CO_2$ capture from air, among other applications.

SUMMARY OF THE PRESENT INVENTION

The present development is a method for removing $CO_2$ from a flue gas stream wherein the method comprises using a metal aluminate nanowire absorbent, wherein the metal is selected from lithium, calcium, sodium, potassium and a combination thereof, for the adsorption of $CO_2$ from the flue gas stream, and wherein the metal aluminate nanowire is regenerated by venting the flue gas stream from the column and then subjecting the $CO_2$ saturated adsorbent to a dielectric barrier discharge plasma or to a microwave plasma or to a radio frequency (RF) plasma while ensuring that the external temperature does not exceed 300° C.

The metal aluminate nanowire absorbent is an ultra-high capacity carbon dioxide ($CO_2$) sorbent material. Specifically, the carbon dioxide sorbent material comprises metal aluminate nanowires, wherein the metal is selected from the group consisting of lithium, calcium, sodium, potassium or a combination thereof. These nanowire systems are effective for carbon dioxide adsorption at relatively low temperatures, even in the presence of water or steam. The compositions of the present invention also demonstrate low temperature desorption and demonstrate a reversible phase change, for example from a lithium carbonate/alumina core shell to lithium aluminate nanowires, when $CO_2$ is released using a dielectric barrier discharge process. The present development further includes a process for intensifying adsorption and desorption processes using the solid adsorbents of the present invention.

DETAILED DESCRIPTION OF THE PRESENT DEVELOPMENT

The present development is a composition for a carbon dioxide ($CO_2$) sorbent material, a method of making the $CO_2$ sorbent material, and a method of using the $CO_2$ sorbent material. The $CO_2$ sorbent material of the present invention comprises lithium aluminate nanowires, calcium aluminate nanowires, sodium aluminate nanowires, potassium aluminate nanowires, or a combination thereof, which may be referred to herein interchangeably as "$CO_2$ sorbent material" or "sorbent material" or "metal aluminate nanowires". The $CO_2$ sorbent material of the present invention demonstrates ultra-high $CO_2$ capacities and regenerability. As used herein, the term "ultra-high" means a minimum $CO_2$ capacity of about 0.25 g/g. The sorbent material of the present invention has an average $CO_2$ capacity of about 0.3 g/g with a maximum $CO_2$ capacity of about 0.75 g/g. The sorbent material of the present invention is particularly effective for use with $CO_2$ containing gas streams, such as those found in post-combustion stationary processes.

The $CO_2$ sorbent material can be produced as either nanowire powders or extrudate forms. As is known in the art, nanowire powders can be further shaped into the extrudate forms, although other means for preparing extrudates may be used. Alternatively, the $CO_2$ sorbent material can also be used as a coating on a high surface area inert substrate. To prepare the $CO_2$ sorbent material, alumina nanowires are initially prepared and then used for the preparation of the lithium aluminate nanowires, the calcium aluminate nanowires, the sodium aluminate nanowires, the potassium aluminate nanowires, or combinations thereof.

Porous alumina nanowires can be prepared at ambient room temperature or at a high reaction temperature. As used herein, "ambient room temperature" is defined as about 0° C. to about 75° C., but is more preferably in the range of about 15° C. to about 50° C.; "high reaction temperature" is defined as between 750° C. and 1100° C., and more preferably between 900° C. and 1000° C. The ambient room temperature synthesis tends to produce short alumina nanowires whereas the high temperature synthesis tends to produce long alumina nanowires. Either the short alumina nanowires or the long alumina nanowires may be used for preparation of the sorbent material of the present invention.

Figure 1:
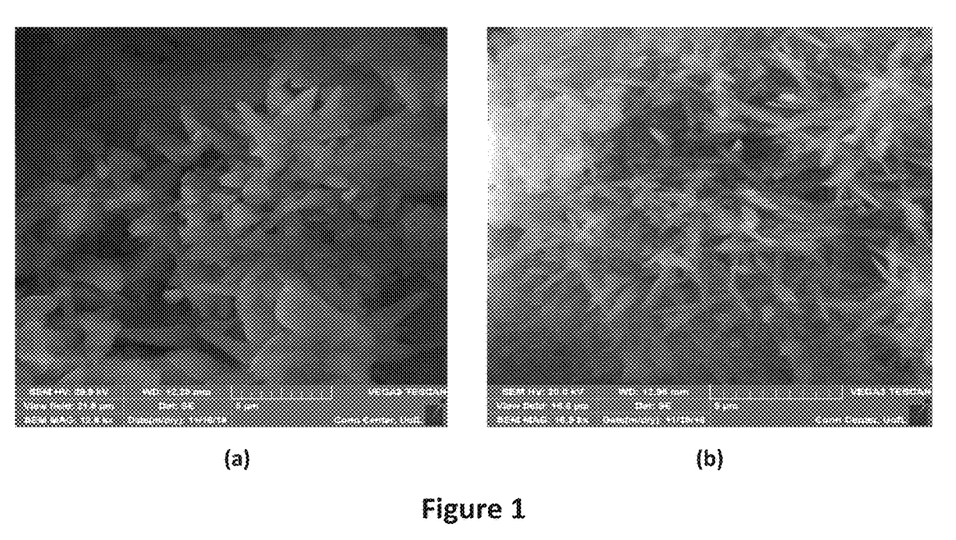
FIG. 1 is a set of SEM images showing alumina nanowires synthesized according to the present invention (a) at room temperature and (b) at 900° C.

Example 1—Ambient Temp Alumina Nanowire Synthesis: The ambient room temperature synthesis is conducted by adding high purity aluminum powder or aluminum foil to a 0.5 molar KOH solution and mixing for 3-4 hours at room temperature to produce potassium aluminate nanowires, which can be converted to alumina nanowires or aluminum oxide nanowires via methods that are known in the art. The resulting alumina nanowires are short nanowires, as shown in FIG. 1(a).

Example 2—High Temp Alumina Nanowire Synthesis: The high temperature synthesis is conducted by reacting $K_2CO_3$ powder with high purity aluminum powder or aluminum foil at temperature of about 900° C. to produce potassium aluminate nanowires, which can be converted to alumina nanowires via methods that are known in the art. The resulting alumina nanowires are long and uniform nanowires, as shown in FIG. 1(b).

Figure 2:
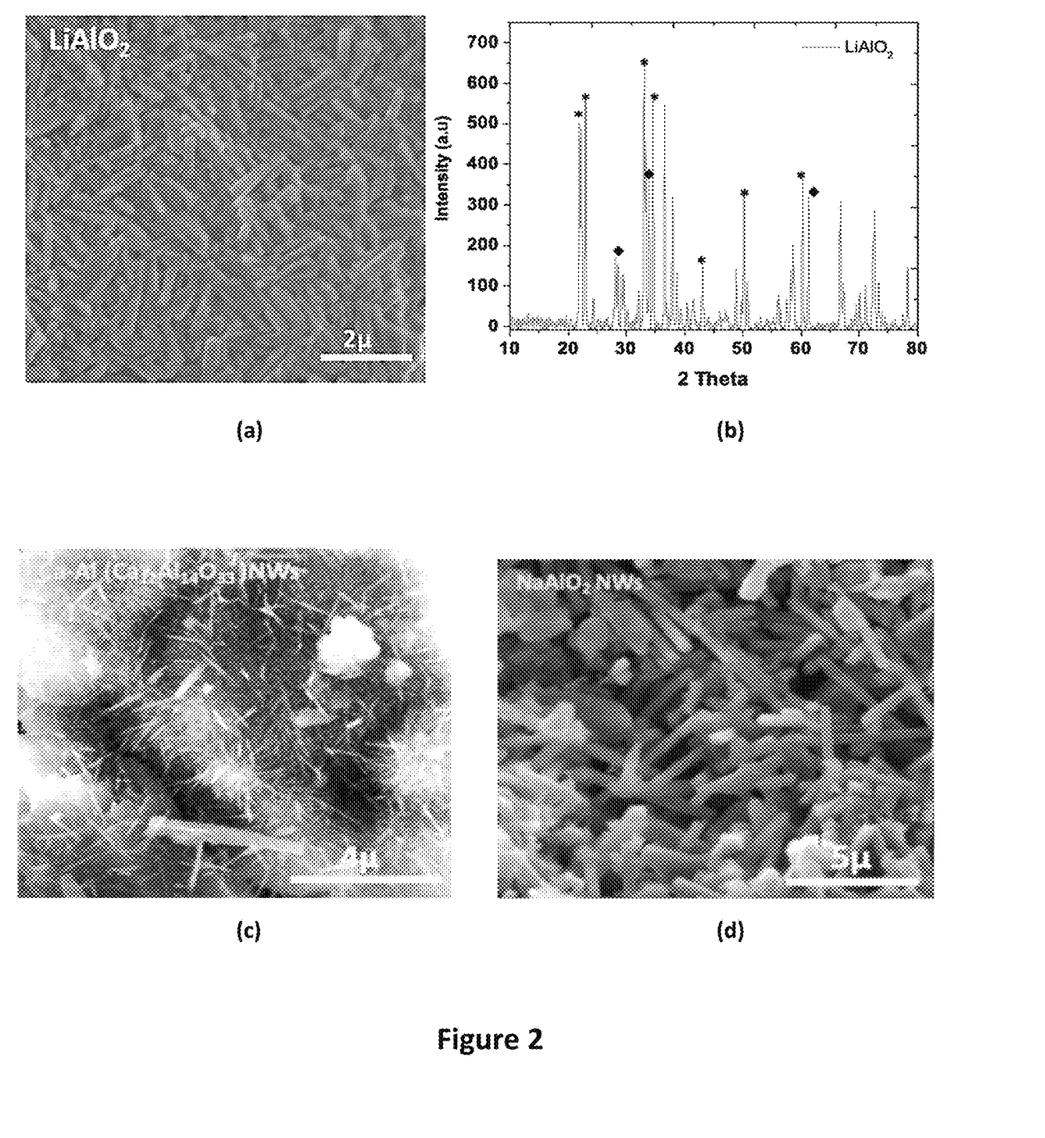
FIG. 2 is a set of images wherein (a) is an SEM image of lithium aluminate nanowires synthesized according to the present invention, (b) is a corresponding XRD pattern for the lithium aluminate nanowires shown in (a), wherein the peaks corresponding to $LiAlO_2$ ($\beta$-$LiAlO_2$) (PDF 00-033-0785) are marked with * and peaks corresponding to $LiAlO_2$ ($\gamma$-$LiAlO_2$) (PDF 00-031-0026) are marked with ♦, (c) is an SEM image of calcium aluminate nanowires synthesized according to the present invention, and (d) is an SEM image of sodium aluminate nanowires synthesized according to the present invention.

The porous alumina nanowires are then converted to the sorbent metal aluminate nanowires using a solvo-solid state thermal oxidation method, which is known in the art. The metal aluminate nanowires, as summarized in Table 1, are prepared by combining hydrated metal hydroxide with the porous alumina nanowires and water to form a paste, and then the paste is coated uniformly onto a quartz slide and subjected to thermal oxidation at about 700° C. for about 3 hours, and then the furnace is allowed to cool to room temperature.

TABLE 1

| Sorbent Material | Hydrated Metal Hydroxide Used | Nanowires Produced | FIG. |
|---|---|---|---|
| lithium aluminate nanowires | hydrated lithium hydroxide | long and uniform | 2(a) |
| calcium aluminate nanowires | hydrated calcium hydroxide | long and uniform | 2(c) |
| sodium aluminate nanowires | hydrated sodium hydroxide | long and uniform | 2(d) |
| potassium aluminate nanowires | | | n/a |

FIG. 2(b) shows the corresponding XRD pattern of the lithium aluminate nanowires, wherein the peaks corresponding to $LiAlO_2$ (β-$LiAlO_2$) (PDF 00-033-0785) are marked with * and peaks corresponding to $LiAlO_2$ (γ-$LiAlO_2$) (PDF 00-031-0026) are marked with ♦.

The metal aluminate nanowires are effective as a carbon dioxide sorbent material, particularly at relatively low temperatures and even in the presence of water or steam. The metal aluminate nanowires also demonstrate relatively low temperature desorption to regenerate the metal aluminate nanowires. As used herein, the term "relatively low temperature" with respect to adsorption or desorption means a reaction temperature below about 300° C., and more preferably below about 225° C., and most preferably below about 200° C. As used herein, the term "moderate temperature" with respect to adsorption or desorption means a reaction temperature between about 200° C. and 750° C. Without being bound by theory and without intending to limit the claims in any way, it is believed that the $CO_2$ sorbent materials demonstrate a reversible phase change, from a metal carbonate/alumina core shell to metal aluminate nanowires, when $CO_2$ is released using a dielectric barrier discharge process or by exposure to a microwave plasma or by exposure to a radio frequency (RF) plasma.

The $CO_2$ adsorbent material is intended to be used in a system designed to decarbonize carbon-based fuels, such as a packed bed system. The $CO_2$ sorbent material is heated to a predetermined temperature using either internal means or external means. For example, internal heating means include use of a dielectric barrier discharge plasma or a microwave plasma or a radio frequency (RF) plasma and external means include steam heating, heating elements, heat jacket, heat blanket, a furnace or a combination thereof.

Figure 3:
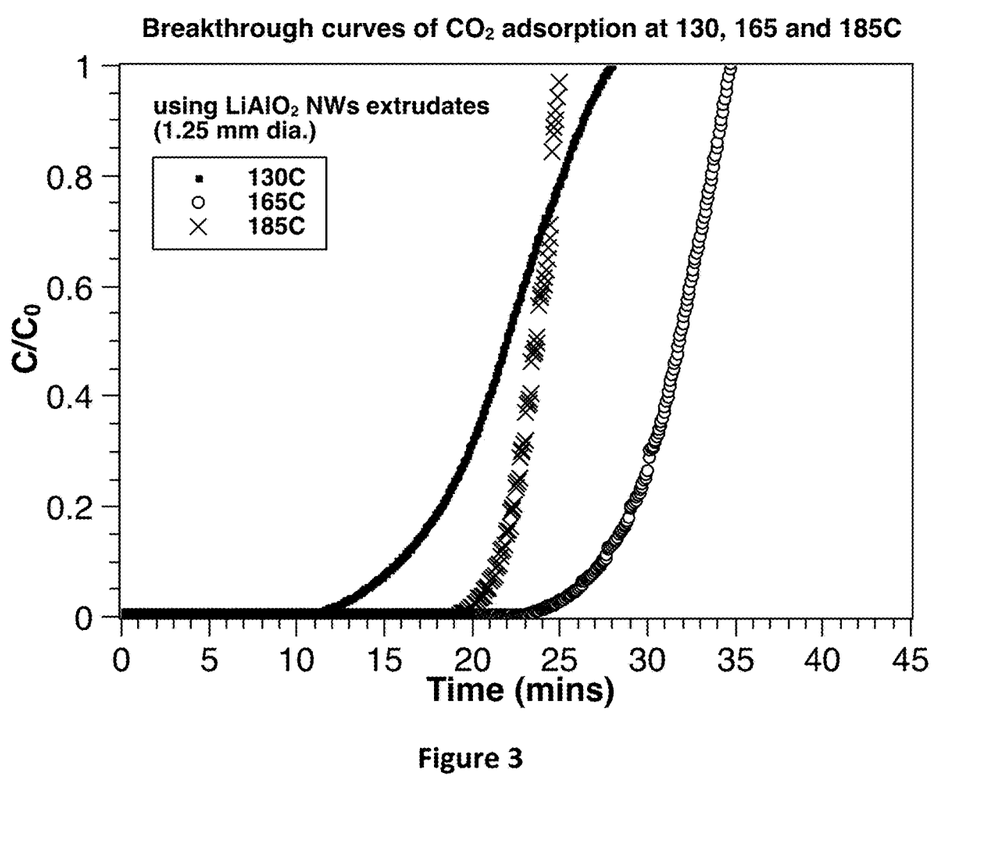
FIG. 3 is a graph showing the amount of $CO_2$ adsorption as $CO_2$ passes through a column packed with lithium aluminate nanowire extrudates heated to 130° C., 165° C. or 185° C.

For the purposes of better demonstrating the invention and not to be otherwise limiting, in one embodiment the $CO_2$ sorbent materials are packed in a column, preferably a glass column, having a thermocouple or electrode running longitudinally through the column along a central axis and through the adsorbent bed, and having the adsorbent bed surrounded by a steam heated jacket or Proportional-Integral-Derivative (PID) controlled furnace. The design is intended to maintain a uniform temperature throughout the bed. Carbon dioxide gas combined with other typical gas components are mixed to simulate a flue gas feed stream with the resulting stream comprising 14-20% $CO_2$, 7-10% $H_2O$ vapor, 14-16% $O_2$, and balanced with 50-60% $N_2$ gas. The gas mixture passes through the sorbent-packed fixed-bed column while maintaining the bed temperature at a predetermined temperature. For laboratory-scale reactions, the packed bed contained from about 3 grams to about 10 grams of $CO_2$ sorbent material. As is known in the art, the carbon dioxide loading in the bed can be determined by a dynamic mass balance, which requires numerical integration of the breakthrough curve data from an adsorption breakthrough run. The total or stoichiometric capacity of the column for $CO_2$ is calculated by the total $CO_2$ uptake divided by the amount of the $CO_2$ sorbent materials in the column. When the bed temperature is maintained at a temperature about 600° C. with a GHSV of about 950/hr, the total $CO_2$ capacity is about 0.09 g/g. However, the $CO_2$ sorbent materials of the present invention, and particularly the lithium aluminate ($LiAlO_2$ and $Li_2AlO_4$) nanowires, are capable of capturing $CO_2$ at temperatures in the range of 90° C. to about 190° C. When the $CO_2$ capture temperature range is from about 130° C. to about 185° C., the $LiAlO_2$ NWs demonstrated $CO_2$ capacity up to about 0.28 g/g absorption, with a theoretical maximum capacity of 0.33 g/g. FIG. 3 is a typical adsorption breakthrough curve of $CO_2$ adsorption using lithium aluminate nanowires. The x-axis is the time of operation, and the y-axis is the outlet $CO_2$ concentration divided by the inlet $CO_2$.

The $CO_2$ sorbent material has also been found to be regenerable, that is, the adsorbed $CO_2$ can be desorbed from the sorbent material. Desorption may be accomplished at moderate temperatures or at relatively low temperatures. Moderate temperature desorption can be achieved by exposing the $CO_2$ saturated adsorbent to a dry air carrier gas stream while raising the reactor temperature to at least about 320° C. and continuing to raise the temperature to at least about 620° C. Alternatively, successful $CO_2$ desorption can be achieved by exposing the $CO_2$ saturated adsorbent to a dielectric barrier discharge plasma, or to a microwave plasma for about 30 seconds with humid air as carrier gas, or by using radio frequency (RF) plasma exposure for 3 minutes, while ensuring that the external temperature does not exceed 200° C.

Figure 4:
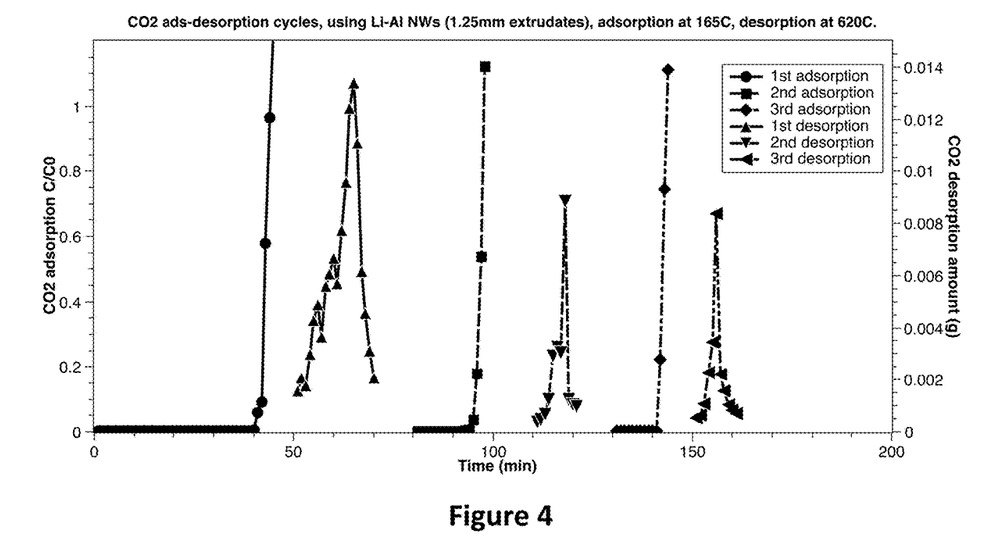
FIG. 4 is a graph showing three continuous cycles of $CO_2$ adsorption-desorption using the present method and $LiAlO_2$ NWs plus a small amount of $Li_5AlO_4$ NWs in 1.25 mm extrudates form, and wherein the adsorption conditions are $CO_2$ inlet concentration is 15% with a $CO_2$ flow rate of 12 ml/min and air+water vapor flow rate at 66 ml/min, packed-bed temperature is 165° C., RH=80% measured at room temperature, and the desorption conditions are dry air flow rate of 50 ml/min, packed-bed temperature is 620° C.

Example 3—Thermal Desorption and Sorbent Regeneration: Lithium aluminate nanowires, $LiAlO_2$ NWs plus a small amount of $Li_5AlO_4$ NWs in 1.25 mm extrudates form, were packed in a glass column in a PID controlled furnace. A flue gas feed stream comprising 14-20% $CO_2$, 7-10% $H_2O$ vapor, 14-16% $O_2$, and balanced with 50-60% $N_2$ gas in the presence of water vapor, was passed through the sorbent material at a $CO_2$ inlet concentration of 15% with a $CO_2$ flow rate of 12 ml/min and air+water vapor flow rate at 66 ml/min, packed-bed temperature is 165° C., RH=80% measured at room temperature. The flue gas stream was discontinued, and the reactor temperature was raised using dry air as carrier gas with a dry air flow rate of 50 ml/min. The reactor temperature was raised to 620° C. and held for about 20 minutes. The. The dry air flow was then discontinued, the reactor temperature was reduced to about 165° C. and the flue gas feed stream was again introduced. This adsorption/desorption cycling was continued for three cycles. As shown in FIG. 4, all three desorption processes were completed in less than 20 minutes and the $CO_2$ sorbent material was successfully regenerated.

Figure 5:
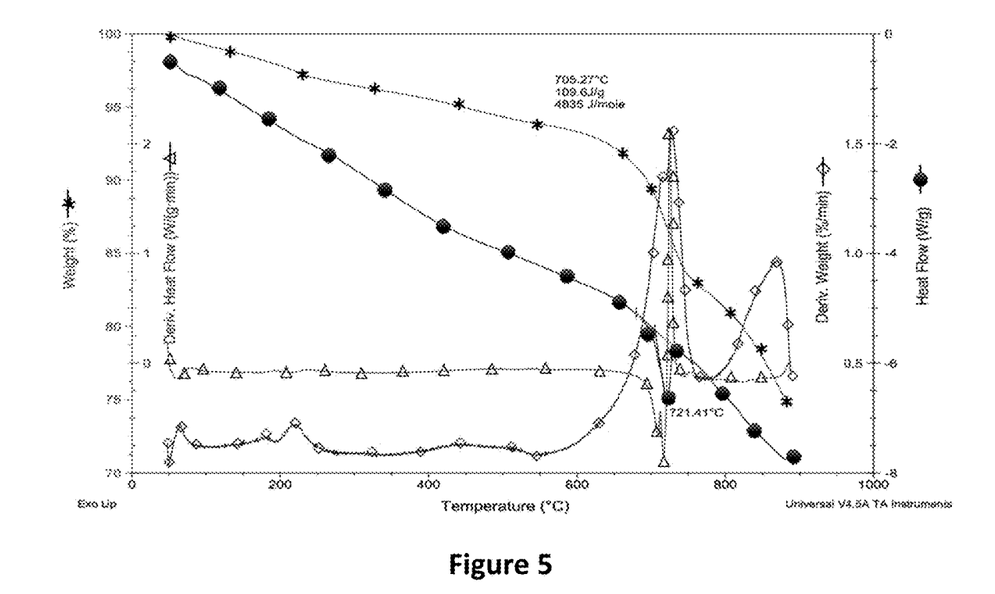
FIG. 5 is a graph showing the TGA-DSC analysis of a $CO_2$ saturated adsorbent using a $Li_2CO_3$ sample, wherein the carrier gas is nitrogen and a water atmosphere at a rate of 100 ml/min.

However, similar to the high temperature $CO_2$ desorption using conventional $CO_2$ adsorbents, a capacity loss was observed after the first adsorption-desorption cycle. The solid state alloying between LiOH and $Al_2O_3$ was not favorable at the temperature of 320° C., and this process was not complete in the short period of time. As shown in FIG. 5, TGA-DSC analysis also confirmed the major $CO_2$ desorption occurred at 620° C.-720° C. The TGA-DSC analysis of the $CO_2$ saturated adsorbent was run using a $Li_2CO_3$ sample, nitrogen as the carrier gas and a water atmosphere at a rate of 100 ml/min. In the presence of water vapor, the maximum $CO_2$ desorption occurred at 727° C. Interestingly, the heat flow during desorption was measured at 4.8 kJ/mol, which was relatively low for chemisorption. The low activation energy is even more attractive to the plasma-based reactions.

Figure 6:
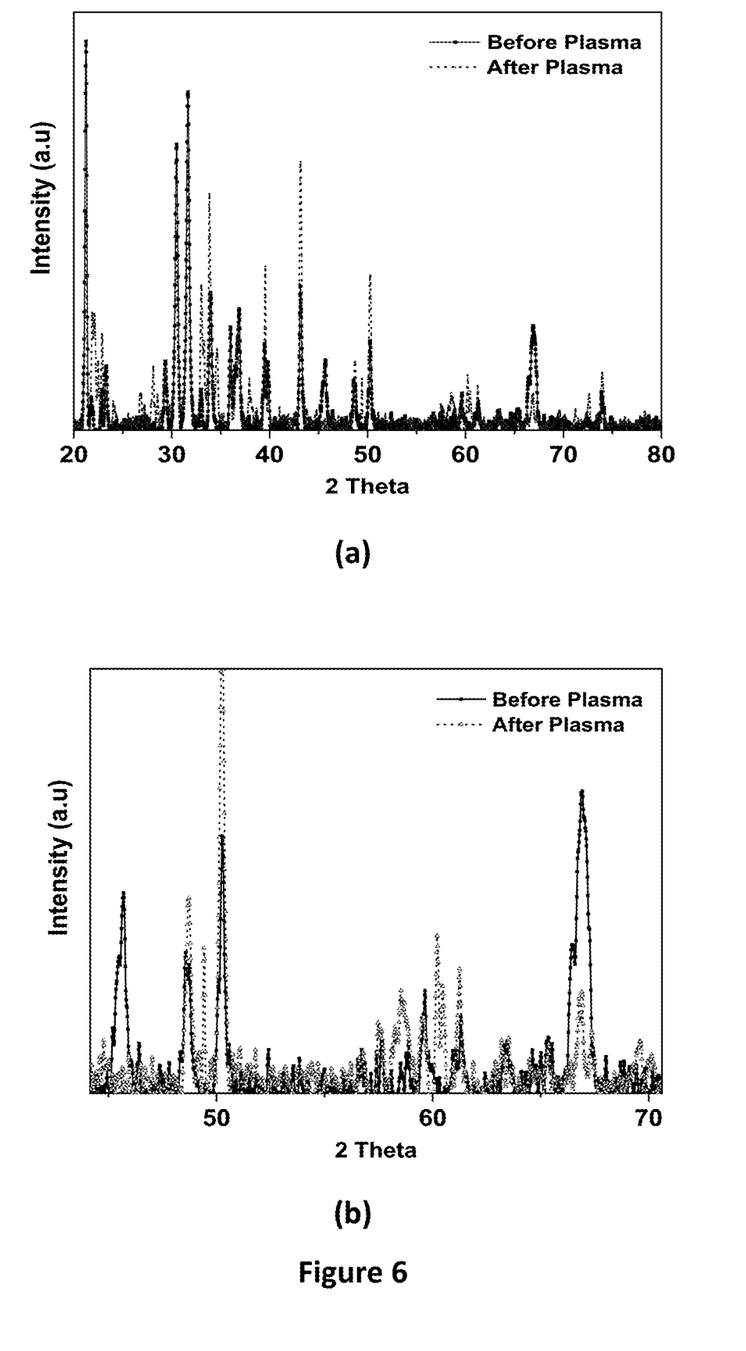
FIG. 6 is a set of XRD graphs of a carbonated $Li_2CO_3$ sample and the same sample regenerated after plasma exposure treatment, wherein (a) is the full XRD graph, (b) is a magnified section of (a) showing the area between about 45 deg and 70 deg, (c) is a magnified section of (a) showing the area between about 20.6 deg and 22.0 deg, and (d) is a magnified section of (a) showing the area between about 21.5 deg and 24.0 deg; and, FIG. 7 a set of graphs showing two continuous cycles of $CO_2$ adsorption-desorption using the present method in a DBD plasma process wherein (a) shows the first adsorption stage, (b) shows the first desorption stage, (c) shows the second adsorption stage, and (d) shows the second desorption stage.

Example 4—Low Temperature Desorption and Sorbent Regeneration: Lithium aluminate nanowires, $Li_2CO_3$ NWs in 1.25 mm extrudate form, were packed in a glass column in a PID controlled furnace. A flue gas feed stream comprising 14-20% $CO_2$, 7-10% $H_2O$ vapor, 14-16% $O_2$, and balanced with 50-60% $N_2$ gas in the presence of water vapor, was passed through the sorbent material at a $CO_2$ inlet concentration of 15% with a $CO_2$ flow rate of 12 ml/min and air+water vapor flow rate at 66 ml/min, packed-bed temperature is 165° C., RH=80% measured at room temperature. The flue gas stream was discontinued, and the $CO_2$ saturated adsorbent was exposed to a microwave plasma for about 30 seconds with humid air as the carrier gas, while ensuring that the external temperature did not exceed 200° C. As shown in FIG. 6, analysis by XRD of the as carbonated $Li_2CO_3$ sample and the regenerated sample after plasma exposure treatment show that using the microwave plasma method the lithium carbonate peaks disappear (peaks at 21.1 deg, 47 deg, and 68 deg) and the lithium aluminate peaks reappear (peaks at 21.8 deg and 22.2 deg), indicating that the lithium aluminate nanowires adsorbed the $CO_2$ and then could be regenerated by exposure to plasma.

Surprisingly, even at low temperatures, the plasma exposure of $CO_2$ adsorbed nanowires resulted in $CO_2$ release followed by regeneration of original sorbent nanowires, $LiAlO_2$. This process seems to happen preferentially in the presence of water vapor compared to the gas phase without the presence of water vapor. It is anticipated that the plasma discharges can be initiated by a variety of means known in the art, including but not limited to plasma using DC, low frequency AC, radio frequency, microwave.

Without being bound by theory, it is believed that the plasma provides positively and negatively charged particles and neutral radicals, and quickly applies the energy to heat up the solid particle surface. The surface heating rate is as high as 3200° C./min from the recombination of radicals and ions. Compared to the traditional external heating rate at 10° C.-50° C./min using heating elements, electron heating in low temperature plasma is much more efficient. Therefore, the hypothesis behind plasma assisted regeneration is that when the $Li_2CO_3$ is exposed to plasma under humid conditions, the hydrogen atoms from the water vapor immediately reacts with the $Li_2CO_3$ to form $Li_2O$ and LiOH species. Simultaneously, plasma oxidation reaction occurs, the LiOH and $Al_2O_3$ forms a molten LiAlO phase, and then the radicals and ions produced in the plasma flame play a key role in the fast nucleation and growth kinetics of $LiAlO_2$ NWs.

The $CO_2$ sorbent material of the present invention can also be used in a system that uses a dielectric barrier discharge plasma or "DBD plasma". This allows the adsorption and desorption to occur at temperatures below about 300° C. and even as low as ambient room temperature. Adsorption can occur with or without heating the $CO_2$ sorbent material. Desorption can occur with or without heating the $CO_2$ sorbent material. In a preferred embodiment, the $CO_2$ sorbent material is heated to a predetermined temperature between about 15° C. and 300° C. In a more preferred embodiment, the $CO_2$ sorbent material is heated to a predetermined temperature between about 40° C. and 200° C. Use of DBD plasma at these temperatures allows for $CO_2$ capture from air as well as heated gases. The DBD can also be operated at relatively low frequencies, such as in the range of from about 1 kHz to about 30 MHz, and preferably in the range of 30 kHz to about 3 MHz, and more preferably in the range of about 30 kHz to about 300 kHz. In order to keep the bed temperature below about 300° C., and more preferably below about 225° C., and most preferably below about 200° C., at all times, one option is to cycle between adsorption and desorption at limited capacity. Alternatively, the DBD can be run in an "interrupted" fashion wherein the DBD is cycled between an on period where the DBD plasma is being generated and an off period where the DBD plasma is not being generated. The on and off periods do not need to be the same lengths. In a preferred embodiment, the on and off cycle periods are between about 0.1 minute to about 100 minutes in length. In a more preferred embodiment, the on and off cycle periods are between about 0.1 minute to about 20 minutes in length. In a most preferred embodiment, the on cycle period is between about 0.1 minute to about 5 minutes in length and the off cycle period is between about 0.1 minute to about 20 minutes in length.

As is known in the art, in the DBD process a central electrode and a ground electrode are installed in a cell and the adsorbent is packed in the electrode gap. The DBD plasma discharge is generated using, for example, inductively coupled plasmas, radio-frequency discharges, direct current and low frequency AC fields. One or more packed DBD cells can be combined in one packed-bed reactor. An exemplary reactor might have three DBD cells, but the number of cells can be up to several hundred. The system can be arranged with a single packed bed, or two or more packed beds operating simultaneously or sequentially.

For demonstration purposes, a laboratory-scale unit was designed using a cylindrical quartz glass chamber having an outer diameter of about 1 inch and a horizontal length of about 6 inches. A stainless-steel electrode having an outer diameter of about 2 mm is placed in the quartz tube and used as a high-voltage electrode. The outer part of the reactor is covered with aluminum foil without a leaving any gaps to create a low-voltage electrode. A thermal couple is attached on the wall the packed bed reactor to measure the bulk desorption temperature. Two terminal ends are connected to the reactor to provide a gas inlet on one side and a gas outlet on the opposing side. The reactor is connected to an external circuit by two separate silicone hoses. In order to provide electrical isolation, the reactor is suspended by a rubber-coated clamp standing hanger system. For the laboratory-scale reactions, the packed bed contained from about 5 grams to about 15 grams of $CO_2$ sorbent material.

Figure 7:
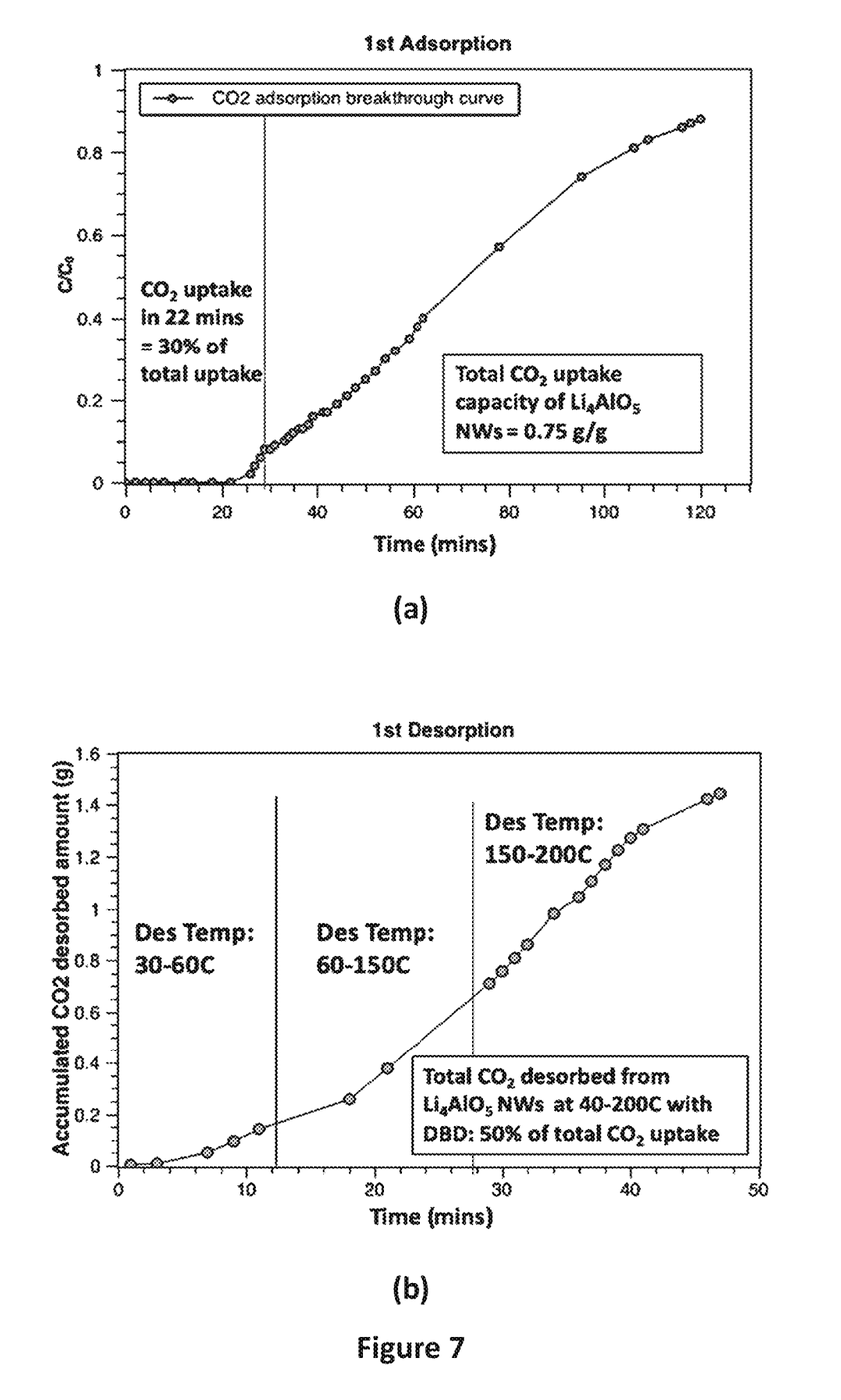

Example 5—Adsorption and Desorption Using DBD Plasma: The laboratory-scale system was used to demonstrate $CO_2$ sorption and desorption at temperatures of less than 200° C. Two cycles of adsorption and desorption were run. Lithium aluminate nanowires, $Li_2CO_3$ NWs in 1.25 mm extrudate form, were packed in the DBD reactor. A simulated flue gas feed stream comprising 14-20% $CO_2$, 7-10% $H_2O$ vapor, 14-16% $O_2$, and balanced with 50-60% $N_2$ gas was passed through the sorbent material in the presence of water vapor at a $CO_2$ inlet concentration of 17% with 2% water vapor at a GHSV of about 2600/hr while maintaining the packed-bed temperature at 20-40° C. As shown in FIG. 7(a), the total $CO_2$ capacity of fresh $Li_4AlO_5$ NWs is about 0.75 g/g. The saturated adsorbent was then regenerated using a dry air purging gas with a GHSV of 2600/hr and with the DBD power turned on. As shown in FIG. 7(b), during the desorption process the bulk temperature was slowly increased from about 30° C. to about 200° C. The $CO_2$ desorption began immediately when the bulk temperature reached about 40° C., and desorption continued as the bulk temperature continued to rise. The desorption process was interrupted at 200° C., by which point about 50% of adsorbed $CO_2$ was desorbed from the packed-bed. The adsorption-desorption cycle was repeated using the same sorbent material and similar uptake and regeneration was observed, as shown in FIGS. 7(c) and 7(d), respectively. Additional multiple cycles experiments showed similar trends.

The desorption process occurs at atmospheric pressure at temperatures below about 200° C. in less than about 20 minutes. Not to be bound or otherwise limited by theory, it is believed that during the desorption process, by generating a uniform DBD plasma in steam at atmospheric pressure, the recombinative heating from radicals, for example, $H+H \rightarrow H_2$ on surfaces, of the active sites can instantaneously increase surface temperatures without heating up the entire packed-bed. The overall energy for keeping the bed at the required 150° C.-200° C. is provided from plasma energy with proper insulation. This approach can be adopted into any low temperature carbon capture from the post-combustion flue gas and industrial boiler exhaust, chemical manufacturing, and $CO_2$ separation from mixed gas streams. Alternatively, steam can be used as a purging gas instead of the dry air gas. It is anticipated that steam will carry the desorbed $CO_2$ in the gas phase out of the sorbent bed, then the steam can be easily condensed and separated as a liquid phase. The use of steam is expected to improve process feasibility and cost effectiveness.

Although the present invention has been described at bench-scale level and is anticipated for large commercial operations, it is further anticipated that the adsorption-desorption process can be performed at a mid-sized operation. For example, a mini $CO_2$ capture and purification plant can be built using reactors having a diameter of from about 12 inches to about 24 inches and a length of about 48 inches, such that the reactor has a capacity for about 5 L of $CO_2$ sorbent material. Such reactors could operate using a power supply of 3-5 kW. Because water vapor is used for both the adsorption and desorption processes, a steam generator and condenser unit could be included to accompany the reactors. A two reactor system, including the steam generator-condenser unit and a power supply panel, could have overall dimensions of about 48 in×40 in×60 in—or small enough to fit on a standard pallet.

Although the present invention has been described using metal aluminate nanowires, it is anticipated that the adsorption-desorption process can be performed using metal tungstate nanowires or metal silicate nanowires or metal molybdate nanowires, wherein the metal is selected from lithium, calcium, sodium, potassium and a combination thereof.

Overall, nanowire morphologies anticipated herein can offer high chemisorption capacities, superfast reaction kinetics, wide range of operating temperatures making them highly suitable for commercial scale implementation in $CO_2$ capture applications. Further, because the use of nanowire materials allow for fast adsorption kinetics, it is anticipated that the $CO_2$ sorbent materials disclosed herein can be used for fluidized bed configurations for sorption for processing large volumes of flue gases or air. It is also anticipated that the nanowires sorbent materials disclosed herein can be used for direct air capture (DAC) of $CO_2$. It is further anticipated that it is possible to create plasma flames to excite gases to provide temperature adjustments during adsorption and that the desorption step can be accomplished using packed beds and dielectric barrier discharges in a packed-bed reactor setting.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. The term "ambient temperature" as used herein refers to an environmental temperature of from about 0° C. to about 75° C., inclusive.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application.

All compositional percentages used herein are presented on a "by weight" basis, unless designated otherwise.

It is understood that, in light of a reading of the foregoing description, those with ordinary skill in the art will be able to make changes and modifications to the present invention without departing from the spirit or scope of the invention, as defined herein. For example, those skilled in the art may substitute materials supplied by different manufacturers than specified herein without altering the scope of the present invention.

What is claimed is:

1. A method for capturing and purifying $CO_2$ from a flue gas stream wherein the method comprises:
   a. providing a $CO_2$ sorbent material selected from lithium aluminate nanowires, calcium aluminate nanowires, sodium aluminate nanowires, potassium aluminate nanowires or a combination thereof;
   b. packing the $CO_2$ sorbent material in a column;
   c. heating the $CO_2$ sorbent material to a predetermined temperature;
   d. allowing the flue gas stream to pass through the $CO_2$ sorbent material in the column while maintaining the sorbent material temperature at the predetermined temperature;
   e. continuing the flue gas flow through the $CO_2$ sorbent material until the $CO_2$ sorbent material becomes a $CO_2$ saturated adsorbent;
   f. venting the flue gas stream from the column; and,
   g. regenerating the $CO_2$ sorbent material by causing the $CO_2$ saturated adsorbent to desorb.

2. The method of claim 1 wherein the predetermined temperature is from about 15° C. to about 300° C.

3. The method of claim 2 wherein the predetermined temperature is from about 40° C. to about 200° C.

4. The method of claim 1 wherein the heating of the $CO_2$ sorbent material to a predetermined temperature is accomplished using internal means.

5. The method of claim 1 wherein the heating of the $CO_2$ sorbent material to a predetermined temperature is accomplished using external means.

6. The method of claim 4 wherein the means for heating the $CO_2$ sorbent material is selected from a dielectric barrier discharge (DBD) plasma or a microwave plasma or a radio frequency (RF) plasma.

7. The method of claim 5 wherein the means for heating the $CO_2$ sorbent material is selected from steam heating, heating elements, heat jacket, heat blanket, a furnace or a combination thereof.

8. The method of claim 1 wherein regenerating the $CO_2$ sorbent material comprises heating of the $CO_2$ saturated adsorbent by exposing the $CO_2$ saturated adsorbent to a dielectric barrier discharge plasma at frequencies ranging from 1 kHz to about 30 MHz.

9. The method of claim 8 wherein the frequencies range from 30 kHz to about 3 MHz.

10. The method of claim 8 wherein the frequencies range from 30 kHz to about 300 kHz.

11. The method of claim 6 wherein desorption of the $CO_2$ saturated adsorbent is achieved by exposing the $CO_2$ saturated adsorbent to a dielectric barrier discharge plasma for from 0.1 minute to 100 minutes.

12. The method of claim 6 wherein the exposure to the DBD plasma alternates in on-off cycles with on periods of 0.1 minute to 100 minutes and off periods of 0.1 minute to 100 minutes.

13. The method of claim 12 wherein the exposure to the DBD plasma alternates in on-off cycles with on periods of 0.1 minute to 20 minutes and off periods of 0.1 minute to 20 minutes.

14. The method of claim 13 wherein the on period is from 0.1 minute to 5 minutes and the off period is from 0.1 minute to 20 minutes.

15. The method of claim 1 wherein desorption of the $CO_2$ saturated adsorbent is achieved by exposing the $CO_2$ saturated adsorbent to a microwave plasma for about 30 seconds with humid air as carrier gas.

16. The method of claim 1 wherein desorption of the $CO_2$ saturated adsorbent is achieved by exposing the $CO_2$ saturated adsorbent to a radio frequency (RF) plasma exposure for 3 minutes.

\* \* \* \* \*